US006887502B2

(12) United States Patent
Chen et al.

(10) Patent No.: US 6,887,502 B2
(45) Date of Patent: May 3, 2005

(54) COMPOSITIONS COMPRISING FAT SOLUBLE SUBSTANCES IN A GLASSY CARBOHYDRATE MATRIX

(75) Inventors: Chyi-Cheng Chen, Binningen (CH); Bruno Leuenberger, Allschwil (CH); Ernst Zedi, Basle (CH)

(73) Assignee: DSM IP Assets B.V., Heerlen (NL)

( * ) Notice: Subject to any disclaimer, the term of this patent is extended or adjusted under 35 U.S.C. 154(b) by 0 days.

(21) Appl. No.: 10/093,724

(22) Filed: Mar. 8, 2002

(65) Prior Publication Data

US 2002/0127303 A1 Sep. 12, 2002

Related U.S. Application Data

(63) Continuation of application No. 09/588,844, filed on Jun. 7, 2000, now abandoned.

(30) Foreign Application Priority Data

Jul. 6, 1999 (EP) .............................................. 99113039
Sep. 13, 1999 (EP) ............................................ 99118177

(51) Int. Cl.$^7$ ........................... A23L 1/09; A23L 1/302; A23L 1/303
(52) U.S. Cl. .............................. 426/89; 426/72; 426/73; 426/98; 426/602; 426/654; 426/658
(58) Field of Search .............................. 426/89, 98, 72, 426/73, 602, 654, 658

(56) References Cited

U.S. PATENT DOCUMENTS

| 2,809,895 | A | * | 10/1957 | Swisher ......................... 512/4 |
| 3,704,137 | A | * | 11/1972 | Beck ........................... 426/651 |
| 3,971,852 | A | * | 7/1976 | Brenner et al. ............. 426/103 |
| 4,045,583 | A | | 8/1977 | Jeffery et al. |
| 4,820,534 | A | | 4/1989 | Saleeb et al. |
| 4,849,225 | A | | 7/1989 | Mitsuhashi et al. |
| 5,087,461 | A | * | 2/1992 | Levine et al. ................. 426/96 |
| 5,124,162 | A | | 6/1992 | Boskovic et al. |
| 5,356,636 | A | | 10/1994 | Schneider et al. |
| 5,972,395 | A | | 10/1999 | Saleeb et al. |

FOREIGN PATENT DOCUMENTS

| CN | 1074933 A | 8/1993 |
| CN | 87104735 A | 2/1998 |
| EP | 1 064 856 A2 | 1/2001 |
| JP | 54-98317 | 8/1979 |
| WO | WO 89/08988 | 10/1989 |
| WO | WO 99/56563 | 11/1999 |

* cited by examiner

Primary Examiner—Helen Pratt
(74) Attorney, Agent, or Firm—Bryan Cave LLP

(57) ABSTRACT

The invention relates to compositions containing a fat soluble substance in a glassy carbohydrate matrix having maltose or a mixture of low-molecular weight carbohydrates, and, optionally, a high-molecular weight carbohydrate. The compositions can be used for multivitamin tablets, hard gelatin capsules, dry food and feed compositions and for enriching sugar.

14 Claims, No Drawings

COMPOSITIONS COMPRISING FAT SOLUBLE SUBSTANCES IN A GLASSY CARBOHYDRATE MATRIX

This is a continuation of U.S. application Ser. No. 09/588,844, filed Jun. 7, 2000 now abandoned.

FIELD OF THE INVENTION

The present invention relates to compositions comprising fat soluble substances in a glassy carbohydrate matrix, to a process for their manufacture and to their use to enrich food and feed.

BACKGROUND OF THE INVENTION

Water soluble compositions of fat soluble vitamins play an important role in the field of human and animal nutrition. Such compositions are usually marketed in the form of emulsions or dry powders. It is a common feature in such compositions that the fat soluble vitamins are usually protected with a matrix component, e.g., a gelatin matrix.

Stable vitamin compositions have also been conventionally obtained by a method wherein the vitamins are encapsulated in matrixes in the form of a powder. Products on the market are, e.g., vitamin A palmitate encapsulated in a CAPSUL® matrix, available under the name Vitamin A Palmitate 250 SD by F. Hoffmann-La Roche AG, and vitamin A palmitate encapsulated in a gelatin matrix, available under the name Vitamin A Palmitate 250 CWS by F. Hoffmann-La Roche AG.

All the products on the market are sensitive to air, heat, light and humidity. Thus, there is a constant need to improve the stability under regular storage conditions. Accordingly, the problem addressed by the present invention was to find compositions comprising fat soluble substances showing an improved storage stability.

It has now been found that the stability can be improved by encapsulating one or more fat soluble substances in a glassy low-molecular weight carbohydrate matrix.

SUMMARY OF THE INVENTION

One embodiment of the present invention is a composition that includes from about 1 wt % to about 40 wt % of a fat soluble substance encapsulated in a carbohydrate matrix. The carbohydrate matrix includes a low-molecular weight carbohydrate and from about 0.1 wt % to about 30 wt % of an emulsifier.

Another embodiment of the present invention is a process for preparing a composition. The process includes preparing an oil-in-water emulsion including from about 1 wt % to about 40 wt % of a fat soluble substance, from about 30 wt % to about 85 wt % of a low-molecular weight carbohydrate, and from about 0.1 wt % to about 30 wt % of an emulsifier.

DETAILED DESCRIPTION OF THE INVENTION

The present invention relates to compositions having in percents by weight based on the total weight of the composition from about 1 wt % to about 40 wt % of a fat soluble substance and from about 0.1 wt % to about 30 wt % of an emulsifier, encapsulated in a carbohydrate matrix composed of maltose or maltose syrup, or a mixture of low-molecular weight carbohydrates, optionally in combination with 0.1 wt % to about 50 wt % of a high-molecular weight carbohydrate and, optionally, from about 0.1 wt % to about 15 wt % of an antioxidant. As used herein, all percents by weight are based on the total weight of the composition.

The fat soluble substances include fat soluble vitamins selected from vitamins A, E, and D and derivatives thereof, carotenoids such as, e.g., beta-carotene, astaxanthin, apocarotenal, canthaxanthin, apoester, citranaxanthin and zeaxanthin, and polyunsaturated fatty acids, as well as mixtures thereof. Particularly interesting products contain fat soluble vitamins, preferably vitamin A and its derivatives, especially vitamin A acetate or vitamin A palmitate. If the composition comprises a fat soluble vitamin, it is advantageous to add an antioxidant. Thus, a preferred composition comprises in percents by weight based on the total weight of the composition from about 1 wt % to about 40 wt % of a fat soluble vitamin, 0.1 wt % to about 30 wt % of an emulsifier and from about 0.1 wt % to about 15 wt % of an antioxidant encapsulated in a carbohydrate matrix composed of maltose or maltose syrup, or a mixture of low-molecular weight carbohydrates, optionally in combination with a high-molecular weight carbohydrate.

Preferred examples of polyunsaturated fatty acids are selected from the group consisting of arachidonic acid (AA), docosahexaenic acid (DHA) or eicosapentaenic acid (EPA).

Low-molecular weight carbohydrates include mono- and di-saccharides such as, e.g., fructose, glucose, glucose syrup, sucrose, lactose, dextrose, maltose, high-maltose solid (syrup), xylose, arabinose, ribose and sugar alcohols. Especially preferred are fructose, glucose, glucose syrup, maltose and sucrose. Maltose can be used also in the form of high-maltose solid (syrup), which contains over 50 wt % of maltose.

The low-molecular weight carbohydrates are used at a level of about 30 wt % to about 95 wt %, preferably of about 50 wt % to about 85 wt %, more preferably about 70 wt %.

High-molecular weight carbohydrates include, e.g., maltodextrin, which, when present, is used at a level of 0.1 wt % to about 50 wt %, preferably about 5 wt % to about 40 wt %, more preferably about 5 wt % to about 35 wt %., most preferably about 30 wt %.

Maltodextrin can be obtained from Grain Processing Corp. under the trade name MALTRIN.

Suitable emulsifiers are polyoxyethylene-sorbitan-fatty acid esters, e.g., mono- and tri-lauryl, palmityl, stearyl and oleyl esters, especially those available under the tradename TWEEN (for example TWEEN 80, TWEEN 60, TWEEN 40, TWEEN 20) from ICI, chemically modified starch obtainable from National Starch & Chemical Company under the tradename CAPSUL and HI-CAP, and ascorbyl palmitate.

Suitable antioxidants are selected from the group consisting of sodium ascorbate, ascorbyl palmitate, dl-α-tocopherol, mixed tocopherols, lecithin, butylated hydroxy toluene (BHT), butylated hydroxy anisole (BHA) and mixtures thereof. Preferred are sodium ascorbate, ascorbyl palmitate, dl-α-tocopherol, mixed tocopherols and lecithin.

The antioxidants can be added either to the aqueous phase and/or to the lipid phases. Sodium ascorbate is preferably added to the aqueous phase. Ascorbyl palmitate and/or dl-α-tocopherol are preferably added to the lipid phase.

The compositions in accordance with the invention can be manufactured by preparing an oil in water emulsion containing from about 1 wt % to about 40 wt % of a fat soluble substance, from about 30 wt % to about 85 wt % of maltose or a mixture of low-molecular weight carbohydrates optionally in combination with 0 wt % to about 50 wt % of a high-molecular weight carbohydrate, from about 0.1 wt % to about 30 wt % of an emulsifier, and, optionally, from about 0.1 wt % to about 15 wt % of an antioxidant and, if desired, converting this emulsion into a dry powder.

It is self evident that the total amount of the ingredients is not beyond 100 wt %.

Generally the low-molecular weight carbohydrates optionally in combination with high-molecular weight carbohydrates are first dissolved in water. It is advantageous to carry out this process step at a temperature in the range of about 20° C. to about 90° C., preferably about 40° C. to about 75° C. Then the antioxidant and the emulsifier are added. The so called carbohydrate matrix is obtained in this manner. Then, the fat soluble substance or a mixture of several such substances is mixed with an antioxidant, if desired, and the resulting mixture is gradually added to the aqueous phase while the mixture is homogenized with a mixer to form an oil in water emulsion. The procedure can be carried out readily at temperatures of about room temperature to about 80° C., preferably at about 30° C. to about 50° C., more preferably about 40° C.

The conversion of a thus-manufactured emulsion into a dry powder can be effected by methods known in the art, e.g., by spray drying.

The compositions in accordance with the invention show an excellent stability at temperatures up to 35° C. and show a better stability under humid conditions as shown in Example 2, 3 and 4 versus Example 1 in Table 1. The use of a low-molecular weight sugar mixture prevents sugar crystallization from the sugar glass matrix, and thus the stability of the fat soluble substance, particularly the stability of fat soluble vitamins under humid stress conditions, is improved.

The compositions in accordance with the invention can be used for multivitamin tablets, hard gelatin capsules and dry food and feed compositions.

Furthermore, the composition can be mixed directly without using any adhesive with sugar, e.g., with sucrose. This is an essential advantage as Vitamin A Palmitate 250 SD or Vitamin A Palmitate 250 CWS require the use of oil as an adhesive to ensure homogeneity and no segregation.

To enrich sugar it is advantageous to prepare a premix by mixing sugar and the dry powder of the composition according to the invention in a ratio of about 14 to 1 to about 4 to 1. The sugar crystals are preferably wetted before being added to the dry powder by adding a small amount of a saturated sucrose solution or water. To reduce its hygroscopicity, it is advantageous to coat the premix with an anti-caking agent, such as silicic acid or with silicate, by simply shaking the premix with the anti-caking agent. The anti-caking agent is added in an amount of about 0.2 wt % to about 2 wt %.

It is to be understood that the compositions of the invention may be administered to a subject in various pharmaceutically acceptable formulations that are known in the art. Specific examples include tablets, capsules, and dry food and feed compositions.

The following examples are provided to further illustrate the process of the present invention. These examples are illustrative only and are not intended to limit the scope of the invention in any way.

EXAMPLES

Example 1

Starch sodium octenyl succinate (84.0 g CAPSUL from National Starch & Chemical, Bridgewater, N.J.) was dissolved in water (402 g) and heated to 65° C. Sucrose (461.5 g) and maltodextrin (243.1 g, MALTRIN M100, Grain Processing Corp., Muscatine, Iowa) were then dissolved in the starch solution and the temperature was maintained at about 65° C. Sodium ascorbate (15 g) was then added to the sucrose solution and the solution was maintained at 40° C. Water lost due to evaporation was made up before homogenization with the lipid phase. A mixture of vitamin A palmitate (179.6 g), dl-α-tocopherol (15.75 g) and ascorbyl palmitate (15.75 g) was stirred and heated to 40° C. and then stirred at that temperature for about 15 minutes. The lipid phase mixture (201 g) was then gradually added to the sucrose solution and homogenized under nitrogen with a homogenizer (Gifford-Wood homogenizer) to yield an emulsion having a particle size of approximately 0.2–1.5 microns. The viscosity of the emulsion was adjusted with additional water, if necessary. The emulsion was spray-dried (Niro Atomizer, Copenhagen, Denmark) to give a powder.

Example 2

Starch sodium octenyl succinate (84.0 g, CAPSUL from National Starch & Chemical, Bridgewater, N.J.) was dissolved in water (374 g) and heated to 65° C. Maltose (368.2 g) and maltodextrin (364.7 g, MALTRIN M100, Grain Processing Corp., Muscatine, Iowa) were dissolved in the starch solution and the temperature was maintained at about 65° C. Sodium ascorbate (15 g) was then added to the sucrose solution and the solution was maintained at 40° C. Water lost due to evaporation was made up before homogenization with the lipid phase. A mixture of vitamin A palmitate (179.6 g), dl-α-tocopherol (15.75 g) and ascorbyl palmitate (15.75 g) was stirred and heated to 40° C. and then stirred at that temperature for about 15 minutes. The lipid phase mixture (201 g) was then gradually added to the sucrose solution and homogenized under nitrogen with a homogenizer (Gifford-Wood homogenizer) to yield an emulsion having a particle size of approximately 0.2–1.5 microns. The viscosity of the emulsion was adjusted with additional water, if necessary. The emulsion was spray-dried (Niro Atomizer, Copenhagen, Denmark) to give a powder.

Example 3

Starch sodium octenyl succinate (84.0 g, CAPSUL from National Starch & Chemical, Bridgewater, N.J.) was dissolved in water (366 g) and heated to 65° C. Sucrose (69.2 g), Glucose syrup (88 g), maltose (73.6 g), glucose (76.0 g), fructose (69.2 g) and maltodextrin (364.7 g, MALTRIN M100, Grain Processing Corp., Muscatine, Iowa) were dissolved in the starch solution and the temperature was maintained at about 65° C. Sodium ascorbate (15 g) was then added to the sucrose solution and the solution was held at 40° C. Water lost due to evaporation was made up before homogenization with the lipid phase. A mixture of vitamin A palmitate (179.6 g), dl-α-tocopherol (15.75 g) and ascorbyl palmitate (15.75 g) was stirred and heated to 40° C. and then stirred at that temperature for about 15 minutes. The lipid phase mixture (201 g) was then gradually added to the sucrose solution and homogenized under nitrogen with a homogenizer (Gifford-Wood homogenizer) to yield an emulsion having a particle size of approximately 0.2–1.5 microns. The viscosity of the emulsion was adjusted with additional water, if necessary. The emulsion was spray-dried (Niro Atomizer, Copenhagen, Denmark) to give a powder.

Example 4

Starch sodium octenyl succinate (84.0 g, CAPSUL from National Starch & Chemical, Bridgewater, N.J.) was dissolved in water (377 g) and heated to 65° C. Sucrose (115 g), maltose (122.3 g), glucose (126.2 g) and maltodextrin (364.7 g, MALTRIN M100, Grain Processing Corp., Muscatine, Iowa) were dissolved in the starch solution and the temperature was maintained at about 65° C. Sodium ascorbate (15 g) was then added to the sucrose solution and the solution was held at 40° C. Water lost due to evaporation was made up before homogenization with the lipid phase. A mixture of vitamin A palmitate (179.6 g), dl-α-tocopherol (15.75 g) and ascorbyl palmitate (15.75 g) was stirred and heated to 40° C. and then stirred at that temperature for about 15 minutes. The lipid phase mixture (201 g) was then gradually added to the sucrose solution and homogenized under nitrogen with a homogenizer (Gifford-Wood homogenizer) to yield an emulsion having a particle size of approximately 0.2–1.5 microns. The viscosity of the emulsion was adjusted with additional water, if necessary. The emulsion was spray-dried (Niro Atomizer, Copenhagen, Denmark) to give a powder.

Example 5

Stability Evaluation

Each sample prepared as described in Examples 1–4 was mixed sucrose (table sugar) in a ratio of 1 to 4. The mixture was then stored in sealed polyethylene bags at 37° C./75% relative humidity for vitamin A stability evaluation. The % Vitamin A palmitate retention at various time intervals are shown in the following Table 1. It shows that the samples prepared with maltose only (Example 2) or with a mixture of low molecular weight carbohydrates (Example 3 and 4) according to the invention have overall good stability, whereas the sample prepared with sucrose only (Example 1) shows a sudden loss of vitamin A after 1.5-month storage, which significantly reduces the shelf-life of the product.

TABLE 1

|  | Example 1 | Example 2 | Example 3 | Example 4 |
| --- | --- | --- | --- | --- |
| Sucrose | 46.15 | 0 | 6.92 | 11.5 |
| Maltose | 0 | 34.61 | 6.92 | 11.5 |
| Glucose syrup | 0 | 0 | 6.92 | 0 |
| Glucose | 0 | 0 | 6.92 | 11.5 |
| Fructose | 0 | 0 | 6.92 | 0 |
| Maltrin M100 | 23.07 | 34.61 | 34.61 | 34.61 |
| Capsul | 7.69 | 7.69 | 7.69 | 7.69 |
| Vitamin A Palmitate | 17.1 | 17.1 | 17.1 | 17.1 |
| Sodium Ascorbate | 1.5 | 1.5 | 1.5 | 1.5 |
| α-DL-Tocopherol | 1.5 | 1.5 | 1.5 | 1.5 |
| Ascorbyl Palmitate | 1.5 | 1.5 | 1.5 | 1.5 |
| Water | (1.5) | (1.5) | (1.5) | (1.5) |
| Total | 100 | 100 | 100 | 100 |
| % Vitamin A Retention at 37° C./75% RH | | | | |
| Initial | 100 | 100 | 100 | 100 |
| 0.5 months | 99.1 | 89.8 | 91.2 | 94.2 |
| 1.0 months | 104 | 99.0 | 96.6 | 105 |
| 1.5 months | 100 | 92.7 | 94.1 | 94.0 |
| 2.0 months | 0 | 92.9 | 99.2 | 87.7 |
| 2.5 months | 0 | 86.7 | 55.9 | 52.8 |
| 3.0 months | 0 | 73.9 | 54.2 | 47.8 |

The invention being thus described, it will be obvious that the same may be varied in many ways. Such variations are not to be regarded as a departure from the spirit and scope of the invention and all such modifications are intended to be included within the scope of the following claims.

What is claimed is:

1. A composition comprising from about 1 wt % to about 40 wt % of a fat soluble substance and from about 0.1 wt % to about 30 wt % of an emulsifier, encapsulated in a carbohydrate matrix comprising water and a carbohydrate source consisting essentially of maltose, maltose syrup, or a low-molecular weight carbohydrate selected from the group consisting of fructose, lactose, xylose, arabinose, ribose, sugar alcohols, and mixtures thereof.

2. A composition according to claim 1 wherein the fat soluble substance is a fat soluble vitamin selected from the group consisting of vitamins A, E, D and K and derivatives thereof, a carotenoid, a polyunsaturated fatty acid and mixtures thereof.

3. A composition according to claim 2 wherein the fat soluble substance is vitamin A acetate or vitamin A palmitate.

4. A composition according to claim 2 wherein the fat soluble substance is a carotenoid selected from the group consisting of beta-carotene, astaxanthin, apocarutenal, canthaxanthin, apoester, citranaxanthin, and zeaxanthin.

5. A composition according to claim 2 wherein the fat soluble substance is a polyunsaturated fatty acid selected from the group consisting of arachidonic acid (AA), docosahexaenic acid (DHA), and elcosapentaenic acid (EPA).

6. A composition according to claim 1 wherein the low-molecular weight carbohydrate is present in the composition in an amount of from about 30 wt % to about 95 wt %.

7. A composition according to claim 6 wherein the low-molecular weight carbohydrate is present in the composition in an amount of from about 50 wt % to about 85 wt %.

8. A composition according to claim 7 wherein the low-molecular weight carbohydrate is present in the composition in an amount of about 70 wt %.

9. A composition according to claim 1 wherein the emulsifier is selected from the group consisting of polyoxyethylene-sorbitan-fatty acid ester, a chemically modified starch and ascorbyl palmitate.

10. A composition according to claim 1 wherein the carbohydrate matrix further comprises an antioxidant in an amount of from about 0.1 wt % to about 15 wt %.

11. A composition according to claim 10 wherein the antioxidant is selected from the group consisting of sodium ascorbate, ascorbyl palmitate, dl-α-tocopherol, mixed tocopherols, lecithin, and mixtures thereof.

12. A process for preparing a composition comprising preparing an oil-in-water emulsion comprising water and from about 1 wt % to about 40 wt % of a fat soluble substance, from about 30 wt % to about 85 wt % of a carbohydrate source consisting essentially of at least one low-molecular weight carbohydrate, and from about 0.1 wt % to about 30 wt % of an emulsifier.

13. A process according to claim 12 wherein the composition further comprises an antioxidant in an amount of from about 0.1 wt % to about 15 wt %.

14. A process according to claim 12 further comprising drying the emulsion to form a dry powder.

* * * * *

UNITED STATES PATENT AND TRADEMARK OFFICE
CERTIFICATE OF CORRECTION

PATENT NO. : 6,887,502 B2
DATED : May 3, 2005
INVENTOR(S) : Chyi-Cheng Chen et al.

It is certified that error appears in the above-identified patent and that said Letters Patent is hereby corrected as shown below:

<u>Column 6,</u>
Line 21, please change "apocarutenal" to -- apocarotenal --;
Line 26, please change "elcosapentaenic" to -- eicosapentaenic --.

Signed and Sealed this

Twenty-sixth Day of July, 2005

JON W. DUDAS
*Director of the United States Patent and Trademark Office*